(12) United States Patent
Mabuchi et al.

(10) Patent No.: US 9,843,523 B2
(45) Date of Patent: Dec. 12, 2017

(54) COMMUNICATION MANAGEMENT APPARATUS AND COMMUNICATION MANAGEMENT METHOD FOR VEHICLE NETWORK

(75) Inventors: Mitsuhiro Mabuchi, Tokyo (JP); Kazuhiro Okude, Tokyo (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 474 days.

(21) Appl. No.: 14/399,100

(22) PCT Filed: May 14, 2012

(86) PCT No.: PCT/JP2012/062326
§ 371 (c)(1),
(2), (4) Date: Jan. 6, 2015

(87) PCT Pub. No.: WO2013/171829
PCT Pub. Date: Nov. 21, 2013

(65) Prior Publication Data
US 2015/0124597 A1 May 7, 2015

(51) Int. Cl.
*H04L 12/851* (2013.01)
*H04L 12/413* (2006.01)
(Continued)

(52) U.S. Cl.
CPC ............ *H04L 47/24* (2013.01); *H04L 12/413* (2013.01); *H04L 67/325* (2013.01);
(Continued)

(58) Field of Classification Search
CPC ..... H04L 47/24; H04L 67/325; H04L 12/413; H04L 61/2046; H04L 67/12;
(Continued)

(56) References Cited

U.S. PATENT DOCUMENTS

| 5,778,175 A | 7/1998 | Paul et al. |
| 2004/0057450 A1 | 3/2004 | Okuyama |

(Continued)

FOREIGN PATENT DOCUMENTS

| JP | 09-326818 A | 12/1997 |
| JP | 10-322335 A | 12/1998 |

(Continued)

*Primary Examiner* — Pao Sinkantarakorn
*Assistant Examiner* — Kabir Jahangir
(74) *Attorney, Agent, or Firm* — Sughrue Mion, PLLC

(57) ABSTRACT

A plurality of in-vehicle control apparatuses (100) and a DLC (200) connected to a vehicle network each include a frame monitoring unit (131). The frame monitoring units (131) detect simultaneous transmission of a plurality of communication data having a shared CAN ID by monitoring an error frame transmitted to the vehicle network. The plurality of in-vehicle control apparatuses (100) and the DLC (200) also each include a control determination unit (132) and a transmission/reception control unit (133) that execute adjustment processing to adjust the plurality of communication data having the shared CAN ID when simultaneous transmission of the communication data is detected.

15 Claims, 10 Drawing Sheets

(51) Int. Cl.
*H04L 29/08* (2006.01)
*H04L 12/40* (2006.01)
*H04L 29/12* (2006.01)

(52) U.S. Cl.
CPC ...... *H04L 61/2038* (2013.01); *H04L 61/2046* (2013.01); *H04L 67/12* (2013.01); *H04L 2012/40215* (2013.01); *H04L 2012/40273* (2013.01)

(58) Field of Classification Search
CPC ....... H04L 61/2038; H04L 2012/40273; H04L 2012/40215
See application file for complete search history.

(56) References Cited

U.S. PATENT DOCUMENTS

2005/0286539 A1    12/2005  Okuyama
2009/0080447 A1*    3/2009  Sawada ............... H04L 12/4625
                                               370/401

FOREIGN PATENT DOCUMENTS

| JP | 11-501196 A | 1/1999 |
| JP | 2004-048304 A | 2/2004 |
| JP | 2004-253908 A | 9/2004 |
| JP | 2006-014015 A | 1/2006 |
| JP | 2008-072328 A | 3/2008 |
| JP | 2008-312010 A | 12/2008 |
| JP | 2010-028355 A | 2/2010 |
| JP | 2010-081152 A | 4/2010 |
| WO | 2013/136496 A1 | 9/2013 |

\* cited by examiner

| SUBJECT DEVICE | ID | |
| --- | --- | --- |
| | BEFORE ADJUSTMENT | AFTER ADJUSTMENT |
| IN-VEHICLE CONTROL APPARATUS 100A | ID : A | ID : A |
| IN-VEHICLE CONTROL APPARATUS 100B | ID : B | ID : X |
| IN-VEHICLE CONTROL APPARATUS 100C | ID : C | ID : C |
| IN-VEHICLE CONTROL APPARATUS 100E | ID : E | ID : E |
| IN-VEHICLE CONTROL APPARATUS 100F /INFORMATION TERMINAL 300 | ID : B | ID : B |
| IN-VEHICLE CONTROL APPARATUS 100G | ID : G | ID : G |

COMMUNICATION MANAGEMENT APPARATUS AND COMMUNICATION MANAGEMENT METHOD FOR VEHICLE NETWORK

TECHNICAL FIELD

The disclosure relates to a communication management apparatus for a vehicle network and a communication management method for a vehicle network, with which to manage communication performed via a vehicle network installed in a vehicle such as an automobile.

BACKGROUND ART

Recently, vehicles such as automobiles are installed with an in-vehicle control apparatus constituting a navigation system and in-vehicle control apparatuses for electronically controlling various in-vehicle devices such as an engine and a brake. Vehicles are also installed with many other in-vehicle control apparatuses, such as in-vehicle control apparatuses for controlling devices such as meters that display various conditions of the vehicle. A vehicle network is formed by electrically connecting the respective in-vehicle control apparatuses using a communication line, and various types of vehicle data are exchanged between the respective in-vehicle control apparatuses via the vehicle network.

Meanwhile, as vehicles become ever more sophisticated, the number of in-vehicle control apparatuses constituting the vehicle network tends to increase. With this increase in the number of in-vehicle control apparatuses, or in other words a number of nodes, a communication load of the vehicle network may increase to the extent that communication delays and the like occur.

Hence, an apparatus described in Patent Document 1, for example, calculates a standard deviation of a transmission period of data transmitted to a vehicle network and, when the transmission period of data having a high predefined priority level is shorter than the standard deviation, performs processing to reduce an amount of communication data transmitted to the vehicle network. In so doing, when data having a high priority level are transmitted frequently, the load on the vehicle network can be reduced, and as a result, the data having a high priority level can be transmitted with stability.

Patent Document 1: Japanese Patent Application Publication No. 2010-28355

SUMMARY OF THE INVENTION

Incidentally, the priority level of data transmitted to a vehicle network is typically determined on the basis of identification information such as a CAN ID, which is an ID of a control area network (CAN) allocated in advance to an in-vehicle control apparatus serving as a transmission source of the data. Further, a regulation according to which, when data having different priority levels are transmitted simultaneously, the data having the lower priority level are transmitted after transmitting the data having the higher priority level is normally set in the vehicle network as a communication regulation. This communication regulation is set on the assumption that each in-vehicle control apparatus has different identification information, and therefore, as long as the identification information of the in-vehicle control apparatuses is different, a communication adjustment is performed automatically when a data collision occurs due to simultaneous transmission.

Meanwhile, recent years have witnessed advancements in the development of systems for providing various services through data communication between an external device connected to a vehicle network and an in-vehicle control apparatus, and as a result, data communication may be performed between an external device not intended to be connected to the vehicle network and an in-vehicle control apparatus or the like. More specifically, as shown in FIG. 13, data communication may be performed between an external device connected to a data link connector (DLC) 3, which is connected to a communication line 2 constituting a vehicle network, and in-vehicle control apparatuses 4 and so on connected in advance to a communication line 1. Further, as shown likewise in FIG. 12, an apparatus 5 connected illegally to the communication line 1 may, for example, impersonate a legitimate in-vehicle control apparatus 4 for controlling a navigation system in order to perform data communication with the in-vehicle control apparatuses and so on connected to the vehicle network. When identification information already allocated to the vehicle network is attached to data transmitted via the DLC 3 or data transmitted by the apparatus 5, these data collide with data transmitted by a legitimate in-vehicle control apparatus. As a result, it is determined that data having duplicate identification information exist, and accordingly, an operating mode of the vehicle network may be shifted to a mode for notifying other the in-vehicle control apparatuses and so on of an abnormality, for example by transmitting a message indicating the abnormality to the vehicle network or the like. When the condition of the vehicle network varies in this manner, data originally intended to be transmitted and received by the vehicle network are obstructed or the like, with the result that a data communication function of the vehicle network cannot easily be maintained appropriately.

It should be noted that this problem is not limited to communication with an external device connected to a vehicle network, and is more or less shared to all communication systems that use identification information during data communication.

The invention has been designed in consideration of the circumstances described above, and an object thereof is to provide a communication management apparatus for a vehicle network and a communication management method for a vehicle network, with which communication in which identification information is attached to communication data can be maintained smoothly.

Means for solving the problems described above, as well as actions and effects thereof, are described below.

To achieve the object described above, a communication management apparatus for a vehicle network according to the invention, which manages data communication in a vehicle network on which communication data are exchanged among a plurality of in-vehicle control apparatuses, includes: a detection unit that detects simultaneous transmission of communication data that share identification information allocated to the in-vehicle control apparatuses; and an adjustment unit that executes adjustment processing to adjust the communication data having the shared identification information when the detection unit detects simultaneous transmission of the communication data.

To achieve the object described above, a communication management method for a vehicle network according to the invention, which is used to manage data communication in a vehicle network on which communication data are exchanged among a plurality of in-vehicle control apparatuses, includes: a detection step for detecting simultaneous transmission of communication data that share identification information allocated to the in-vehicle control apparatuses; and an adjustment step for adjusting the communication data having the shared identification information when simultaneous transmission of the communication data is detected in the detection step.

According to the configuration or method described above, when data communication is performed via the vehicle network, identification information identifying a transmission source and communication content of the communication data, for example, is attached to the communication data. Further, for example, when communication data having shared identification information are transmitted to the vehicle network due to allocation of common identification information to different apparatuses or misuse of the identification information by an apparatus connected to the vehicle network, transmission of the communication data is detected. When simultaneous transmission of a plurality of communication data having shared identification information is detected, the plurality of simultaneously transmitted communication data are adjusted. Hence, even when shared identification information is attached to a plurality of communication data such that a classification and a priority level of the communication data cannot be identified, or in other words even when a communication adjustment cannot be performed on the basis of the classification and priority level of the communication data, the plurality of communication data having the shared identification information are adjusted. Accordingly, a collision between the plurality of communication data having the shared identification information or a network error caused by simultaneous transmission of the communication data is suppressed. As a result, smooth communication can be maintained while continuing to perform communication in which the identification information is attached to the communication data.

In an aspect of the invention, the adjustment unit executes processing to modify a transmission timing of the simultaneously transmitted communication data from a timing allocated to the communication data as the adjustment processing.

In an aspect of the invention, the communication data are adjusted in the adjustment step by modifying a transmission timing of the simultaneously transmitted communication data from a timing allocated to the communication data.

According to the configuration or method described above, when simultaneous transmission of a plurality of communication data having duplicate identification information is detected, the transmission timing of the communication data transmitted by the in-vehicle control apparatus that transmits the communication data, for example, is modified. In so doing, the transmission timing of at least one set of communication data among the plurality of communication data having the duplicate identification information is modified, and as a result, simultaneous transmission of the communication data is eliminated.

In an aspect of the invention, the adjustment unit performs transmission timing modification on a transmission timing of communication data that are retransmitted following transmission of an error frame transmitted when simultaneous transmission of the communication data is detected.

In an aspect of the invention, transmission timing modification in the adjustment step is performed on a transmission timing of communication data that are retransmitted following transmission of an error frame transmitted when simultaneous transmission of the communication data is detected.

According to the configuration or method described above, when communication data having shared identification information are transmitted simultaneously, an error frame for notifying the apparatuses and so on connected to the vehicle network of a network error is transmitted to the vehicle network for a predetermined period. When transmission of the error frame is complete, either the simultaneously transmitted communication data are retransmitted, or communication data that were interrupted by the error frame are retransmitted. When the communication data are retransmitted, the transmission timings of the communication data having the shared identification information, from among communication data retransmission timings prescribed in advance on the basis of the identification information and so on, for example, are modified so as to differ from each other. In so doing, when communication data are retransmitted after detecting simultaneous transmission of communication data having shared identification information, simultaneous transmission of the communication data having the shared identification information is eliminated, and as a result, the retransmitted communication data can be transmitted and received appropriately.

In an aspect of the invention, the adjustment unit executes, as the adjustment processing, processing to modify the identification information attached to the simultaneously transmitted communication data.

In an aspect of the invention, the communication data are adjusted in the adjustment step by modifying the identification information attached to the simultaneously transmitted communication data.

According to the configuration or method described above, when a plurality of communication data having shared identification information are transmitted simultaneously, the identification information of at least one set of data is modified so that the simultaneously transmitted communication data have different identification information. In so doing, duplication of the identification information of the communication data is eliminated, and transmission to the vehicle network of communication data having shared identification information is suppressed. As a result, a communication function of the vehicle network can be maintained appropriately by modifying the identification information.

Note that the invention is particularly effective when applied to the invention described above, in which the transmission timing is modified. In addition to modifying the transmission timing, however, when communication data having shared identification information are transmitted simultaneously, it is also effective to modify the identification information, for example. More specifically, when communication data having shared identification information are still transmitted simultaneously even after modifying the transmission timing, it is highly likely that an apparatus or the like connected illegally to the vehicle network is transmitting communication data while impersonating a legitimate in-vehicle control apparatus by following the timing at which the legitimate in-vehicle control apparatus transmits communication data. Therefore, by modifying the identification information itself when communication data having shared identification information are transmitted simultaneously to the vehicle network even after modifying the transmission timing of the communication data, generation of a network error or the like accompanying simultaneous transmission of identical communication data can be suppressed. Further, by modifying the transmission timing before modifying the identification information in this manner, the identification information is modified only when simultaneous transmission of the communication data is not eliminated by modifying the transmission timing. Thus, modification of the identification information can be limited to a minimum range, and as a result, the identification information can be managed with stability.

In an aspect of the invention, the adjustment unit executes the processing to modify the identification formation when simultaneous transmission of the communication data is detected at least a prescribed number of times prescribed in advance.

The identification information attached to the communication data is information indicating a classification of the communication data, the communication content, the priority level, and so on, for example, and the identification information allocated in advance to the in-vehicle control apparatuses and so on is preferably maintained.

According to the configuration described above with regard to this point, the identification information is modified when simultaneous transmission of communication data having shared identification information is detected at least a prescribed number of times. The identification information is therefore modified only in a situation where communication data having shared identification information are continuously transmitted simultaneously, and as a result, the allocated identification information can be managed with stability.

In an aspect of the invention, the adjustment unit executes, as the adjustment processing, at least one of: a. processing to prohibit transmission of the communication data having the shared identification information; and b. processing to stop an operation of a transmission source of the communication data having the shared identification information when simultaneous transmission of the communication data is detected at least an abnormal number of times indicating an abnormality in the vehicle network.

In an aspect of the invention, the adjustment step includes: a. a prohibition step for prohibiting transmission of the communication data having the shared identification information; and b. a stopping step for stopping an operation of the in-vehicle control apparatus that transmits the communication data having the shared identification information, and when simultaneous transmission of the communication data is detected at least an abnormal number of times indicating an abnormality in the vehicle network, the communication data are adjusted by performing at least one of the prohibition step and the stopping step.

When communication data having shared identification information are simultaneously transmitted continuously and repeatedly such that the number of simultaneous transmissions reaches or exceeds a predetermined number, it is highly likely that, for example, an apparatus or the like connected illegally to the vehicle network is transmitting communication data while impersonating a legitimate in-vehicle control apparatus, or that an apparatus having identical functions to the in-vehicle control apparatuses is malfunctioning.

According to the configuration or method described above with regard to this point, when simultaneous transmission of communication data having shared identification information is detected at least the abnormal number of times, transmission of the communication data having the shared identification information is prohibited. In so doing, communication data having identification information that may be being misused or the like are prevented from being transmitted to the vehicle network, and as a result, security is maintained on the vehicle network.

Further, according to the configuration or method described above, when simultaneous transmission of communication data having shared identification information is detected at least the abnormal number of times, the operations of the in-vehicle control apparatuses that transmit the communication data having the shared identification information are stopped. In so doing, the operations of the in-vehicle control apparatuses serving as the transmission sources of the communication data are stopped, and as a result, transmission to the vehicle network of a plurality of communication data having shared identification information is suppressed.

Note that the invention is particularly effective when applied to the invention described above, in which the transmission timing and so on are modified. In addition to modifying the transmission timing and the identification information, however, when communication data having shared identification information are transmitted simultaneously, it is also effective to prohibit transmission or stop operations, for example. More specifically, when communication data having shared identification information are still transmitted simultaneously even after modifying the transmission timing, it is highly likely that an apparatus or the like connected illegally to the vehicle network is transmitting communication data while impersonating a legitimate in-vehicle control apparatus by following the timing at which the legitimate in-vehicle control apparatus transmits communication data. Further, when communication data having shared identification information are still transmitted simultaneously even after modifying the identification information, it is highly likely that an apparatus or the like connected illegally to the vehicle network is transmitting communication data while impersonating a legitimate in-vehicle control apparatus by misusing the identification information attached to the legitimate in-vehicle control apparatus. Therefore, by applying a transmission restriction to the communication data or stopping the operation of the transmission source of the communication data when communication data having shared identification information are transmitted simultaneously to the vehicle network even after modifying the transmission timing and the identification information of the communication data such that possibly unauthorized communication data are prevented from infiltrating the vehicle network, generation of a network error or the like accompanying simultaneous transmission of identical communication data can be suppressed.

In an aspect of the invention, the adjustment unit executes processing to adjust communication data transmitted by the in-vehicle control apparatuses and communication data transmitted from outside the vehicle network as the communication data having the shared identification information.

In an aspect of the invention, communication data transmitted by the in-vehicle control apparatuses and communication data transmitted from outside the vehicle network are adjusted in the adjustment step as the communication data having the shared identification information.

Recent vehicle networks are capable of exchanging communication data with externally connected information terminals and the like, for example. By transmitting and receiving various types of communication data between the information terminal and an in-vehicle control apparatus, various services can be provided. However, when an information terminal that is not originally connected to the vehicle network communicates with an in-vehicle control apparatus in this manner, the information terminal may be infected with a virus, or an unauthorized information terminal may be connected to the vehicle network. When an information terminal infected with a virus or an unauthorized information terminal is connected to the vehicle network, the information terminal may, for example, impersonate a legitimate in-vehicle control apparatus, or in other words misuse the identification information allocated to the legitimate in-vehicle control apparatus, in order to transmit illegal communication data into the vehicle network.

According to the configuration or method described above with regard to this point, communication data transmitted by the in-vehicle control apparatuses and communication data transmitted from outside the vehicle network are selected as the communication data having the shared identification information, and these communication data are adjusted. In so doing, the communication function of the vehicle network can be maintained appropriately through communication data adjustment while allowing externally transmitted communication data to be transmitted into the vehicle network.

In an aspect of the invention, the detection unit and the adjustment unit are provided in each of the plurality of in-vehicle control apparatuses, and when the detection units detect communication data sharing identification information with the identification information allocated to the in-vehicle control apparatuses, the in-vehicle control apparatuses adjust the communication data transmitted thereby via the adjustment processing executed by the adjustment unit.

According to the configuration described above, the detection unit and the adjustment unit are provided in each of the plurality of in-vehicle control apparatuses connected to the vehicle network. When the detection units detect communication data sharing identification information with the identification information allocated to the in-vehicle control apparatuses, the communication data transmitted by the in-vehicle control apparatuses provided with the detection unit and the adjustment unit are adjusted via the adjustment processing performed by the adjustment units. According to the configuration described above, therefore, communication data adjustment is performed by the plurality of in-vehicle control apparatuses serving as the transmission sources of the communication data, and therefore communication data adjustment can be performed on the transmission sources of the communication data.

In an aspect of the invention, a regulation according to which, when a communication data collision occurs due to simultaneous transmission of the communication data, an error frame indicating the communication data collision is transmitted to the vehicle network for a predetermined period, and a regulation according to which, following transmission of the error frame, the communication data are retransmitted in order of a priority level of the communication data, which is indicated by the identification information, are defined as communication regulations of the vehicle network, and when the simultaneously transmitted communication data are retransmitted, the adjustment unit executes the adjustment processing on the retransmitted communication data.

The identification information allocated to the communication data is often used as information indicating the priority level of the communication data such that when a plurality of communication data are transmitted simultaneously, the communication data are retransmitted in order of the priority levels indicated by the identification information. Hence, in a case where communication data having duplicate identification information exist, since the communication data are retransmitted in order of the priority levels indicated by the identification information, the communication data having the duplicate identification information may be transmitted simultaneously.

According to the configuration described above with regard to this point, a transmission sequence of the communication data that are retransmitted following transmission of the error frame is prescribed by the identification information, and therefore, when overlap occurs in the transmission sequence of a plurality of communication data, the adjustment processing is executed on the overlapping communication data. Hence, when communication data having shared identification information are retransmitted after being transmitted simultaneously, the communication data having the duplicate identification information are prevented from being transmitted to the vehicle network simultaneously. As a result, simultaneous transmission to the vehicle network of communication data having duplicate identification information is suppressed during retransmission of the communication data while applying a communication data retransmission regulation based on the identification information.

MODES FOR CARRYING OUT THE INVENTION

First Embodiment

A first specific embodiment of a communication management apparatus for a vehicle network and a communication management method for a vehicle network according to the invention will be described below with reference to FIGS. 1 to 10. Note that the communication management apparatus for a vehicle network and the communication management method for a vehicle network according to this embodiment are used to manage communication performed via a vehicle network installed in a vehicle.

Figure 1:
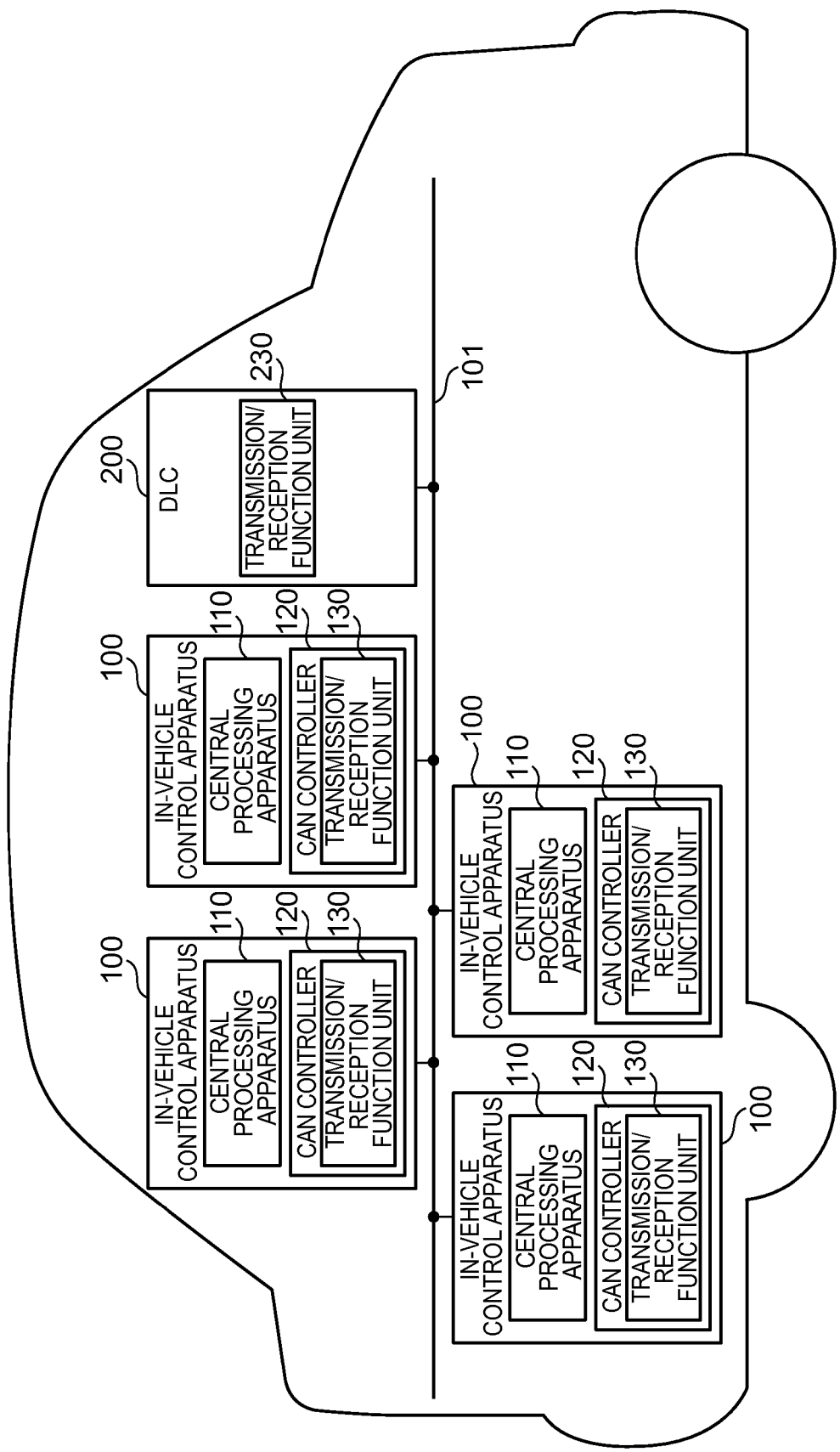
FIG. 1 is a schematic block diagram showing a configuration of a vehicle network to which a communication management apparatus for a vehicle network and a communication management method for a vehicle network according to a first embodiment of the invention are applied.

As shown in FIG. 1, a vehicle is provided with a plurality of in-vehicle control apparatuses 100 and so on that electronically control various in-vehicle devices installed in the vehicle. For example, the in-vehicle control apparatuses 100 control information system devices such as a navigation system, various vehicle driving system devices such as an engine, a brake, and a steering wheel, body system devices such as an air conditioner and meters that display various conditions of the vehicle, and so on.

The in-vehicle control apparatuses 100 are connected to a communication line 101 that constitutes a vehicle network, for example. Each in-vehicle control apparatus 100 transmits and receives communication data, such as sensor data indicating detection results from various sensors that detect conditions of the vehicle and control data relating to various in-vehicle devices, via the communication line 101. Note that in this embodiment, a CAN, for example, is employed as a communication protocol of the vehicle network. Hence, the in-vehicle control apparatuses 100 transmit and receive the communication data in accordance with communication regulations defined by the CAN.

In this embodiment, for example, the communication data are transmitted and received in a frame format on the basis of the CAN communication regulations. Further, in this embodiment, for example, CAN IDs, which are identification information allocated in advance to the in-vehicle control apparatuses 100 and so on serving as frame transmission sources, are attached to frames such as data frames in accordance with the CAN communication regulations. Furthermore, a regulation according to which, when a plurality of frames are transmitted to the vehicle network simultaneously so that the plurality of frames collide, frames and so on transmitted within a predetermined period by the in-vehicle control apparatuses 100 and the like are retransmitted in order from the frame having the CAN ID that shows the smallest number, for example, is set as a CAN communication regulation. Similarly, a regulation according to which, when a plurality of frames having shared identification information are transmitted simultaneously such that the frames collide, an error frame notifying the in-vehicle control apparatuses 100 and so on of a network error is transmitted to the vehicle network, for example, is set as a CAN communication regulation.

Further, for example, a DLC 200 to which devices such as a vehicle diagnosis device are connected is provided in a vehicle cabin of the vehicle. The DLC 200 is connected to the communication line 101 such that the devices connected to the DLC 200 are capable of communicating with the vehicle network. In addition to the diagnosis device, an information terminal such as a smartphone, for example, is connected to the DLC 200 according to this embodiment. By connecting the diagnosis device and the information terminal to the vehicle network via the DLC 200 in this manner, the diagnosis device and the information terminal obtain the communication data transmitted by the in-vehicle control apparatuses 100, for example. Moreover, the diagnosis device and the information terminal transmit various types of data to the vehicle network, for example.

Each in-vehicle control apparatus 100 includes a central processing apparatus 110 that performs various calculations, such as calculations for generating control data for the various in-vehicle devices, for example. The in-vehicle control apparatus 100 also includes a CAN controller 120 that manages transmission and reception of communication data. The CAN controller 120 according to this embodiment performs processing to transmit and receive the communication data using a transmission/reception function unit 130 provided in the CAN controller 120.

The DLC 200 according to this embodiment likewise includes a transmission/reception function unit 230 that processes the communication data transmitted and received via the DLC 200.

Figure 2:
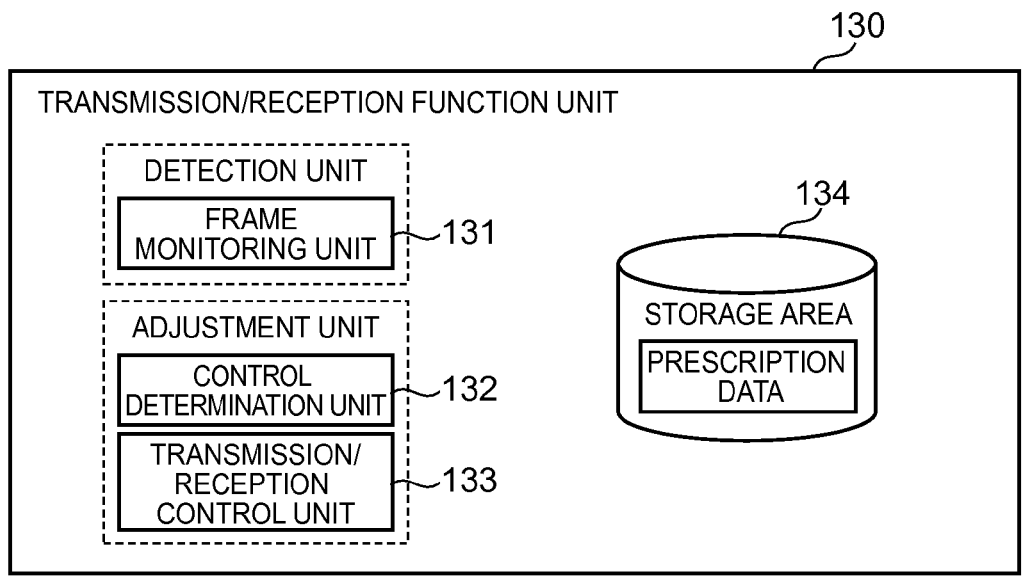
FIG. 2 is a schematic block diagram showing configurations of transmission/reception function units installed respectively in an in-vehicle control apparatus and a DLC.

As shown in the configuration of the transmission/reception function unit 130 (230) in FIG. 2, the transmission/reception function unit 130 according to this embodiment includes a frame monitoring unit 131 that monitors the frames serving as the communication data transmitted to the vehicle network. The transmission/reception function unit 130 also includes a control determination unit 132 that generates a control command for controlling transmission and reception of the communication data on the basis of a monitoring result from the frame monitoring unit 131, and a transmission/reception control unit 133 that transmits and receives the communication data in accordance with the control command generated by the control determination unit 132. The transmission/reception function unit 130 further includes a storage area 134 in which prescription data indicating a classification, a transmission period, and a transmission timing of a frame transmitted to the vehicle network, prescription data prescribing a control interval employed during frame retransmission, and so on are stored. Note that in this embodiment, a time interval extending to a point at which transmission of the error frame and ITM data transmitted after the error frame is complete, for example, is defined as the control interval employed during frame retransmission.

The frame monitoring unit 131 determines a transmission period of each frame transmitted to the communication line 101, a load of the vehicle network, and so on by measuring a transmission/reception interval of the frames transmitted to the communication line 101. Note that the frame monitoring unit 131 identifies a frame on the basis of the CAN ID attached to the frame, and determines the transmission period and so on separately from the identified frame, for example. Further, when the error frame is transmitted to the vehicle network, the frame monitoring unit 131 according to this embodiment recognizes that a frame having a duplicate CAN ID has been transmitted to the vehicle network, and increments an error frame count. The frame monitoring unit 131 then outputs information indicating the transmission period of the frame, the load of the vehicle network, the error frame count, and so on to the control determination unit 132.

The control determination unit 132, after receiving the various information input therein from the frame monitoring unit 131, refers to the prescription data stored in the storage area 134. The control determination unit 132 then selects communication data to be transmitted by the in-vehicle control apparatus 100 or the like provided with the control determination unit 132 on the basis of the information input from the frame monitoring unit 131 and the prescription data, for example, and determines a transmission timing of the selected communication data. The control determination unit 132 also selects communication data to be received by the in-vehicle control apparatus 100 or the like provided with the control determination unit 132 on the basis of the information input from the frame monitoring unit 131 and the prescription data, for example. Further, the control determination unit 132 selects data to be discarded from the communication data received by the in-vehicle control apparatus 100, the DLC 200, or the like in which the control determination unit 132 is provided, for example. The control determination unit 132 then outputs information indicating a selection result and a determination result to the transmission/reception control unit 133.

Furthermore, the control determination unit 132 provided in the DLC 200 selects communication data that may be transmitted to the vehicle network from the communication data transmitted from the smartphone or other information terminal connected to the DLC 200 in which the control determination unit 132 is provided on the basis of the information input from the frame monitoring unit 131 and the prescription data, for example. Moreover, the control determination unit 132 provided in the DLC 200 likewise selects communication data that may be transferred to the information terminal from the communication data transmitted to the vehicle network on the basis of the information input from the frame monitoring unit 131 and the prescription data, for example. Further, the control determination unit 132 selects data to be discarded from the communication data received by the DLC 200 in which the control determination unit 132 is provided, for example.

Furthermore, the control determination unit 132 according to this embodiment, after receiving information indicating an en or frame from the frame monitoring unit 131, determines the frame transmission source causing the error frame, or in other words the transmission source of the frame having the duplicate CAN ID. When the determined transmission source is the in-vehicle control apparatus 100 or the DLC 200 in which the control determination unit 132 is installed, the control determination unit 132 executes adjustment processing to adjust the frame transmitted from the in-vehicle control apparatus 100 or the DLC 200.

Referring to FIGS. 3 to 9, principles of communication data adjustment performed in the communication management apparatus for a vehicle network and the communication management method for a vehicle network according to this embodiment will be described in detail below.

Figure 3:
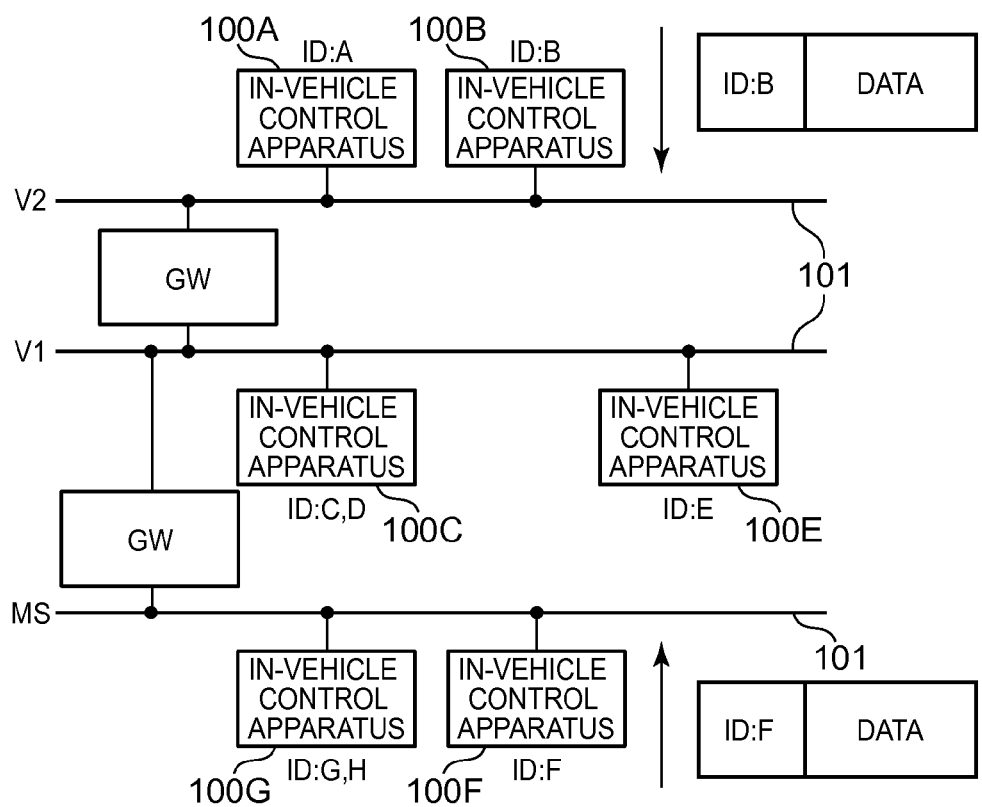
FIG. 3 is a block diagram showing examples of CAN IDs normally allocated to respective in-vehicle control apparatuses, together with a vehicle network.
Figure 4:
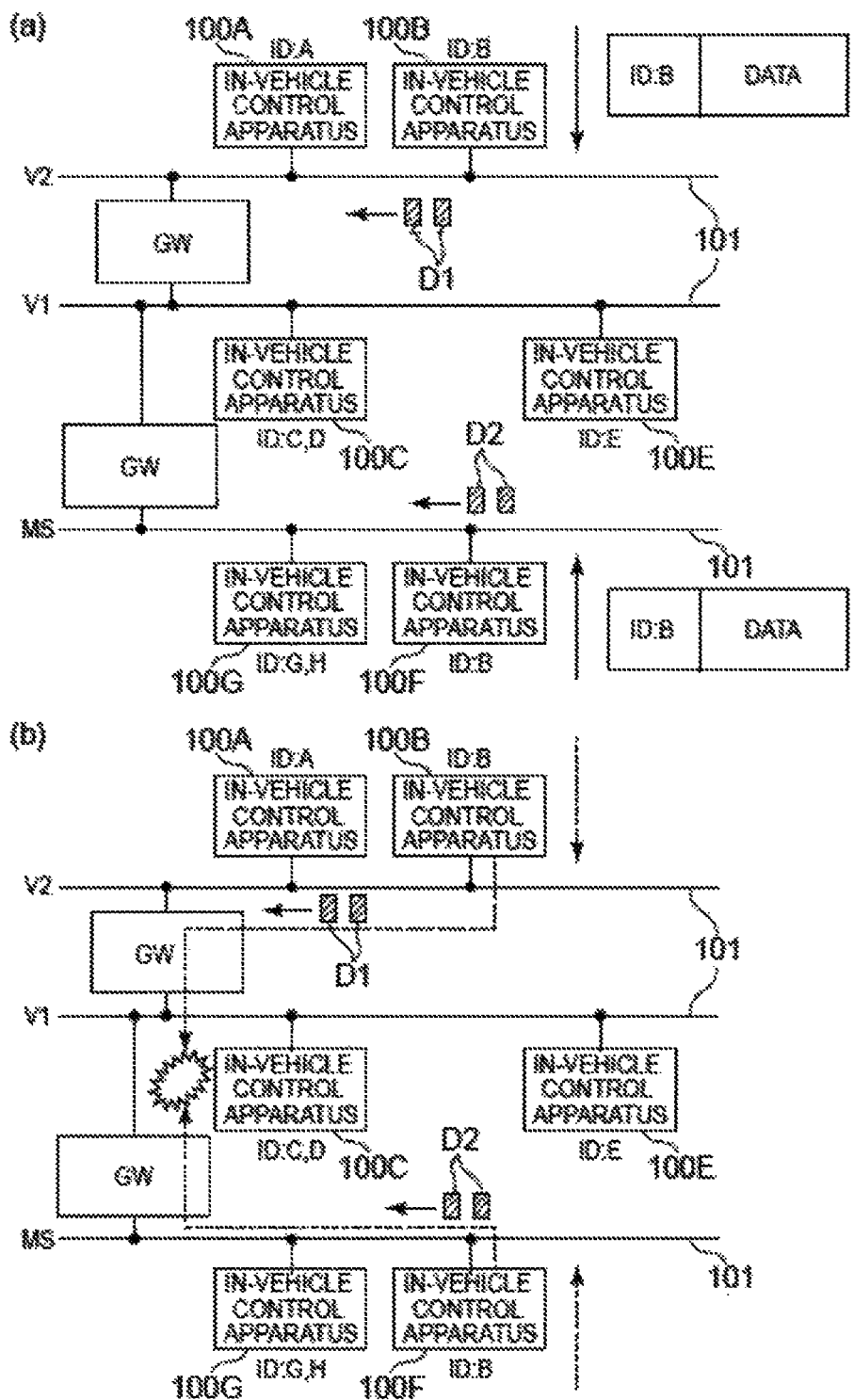
FIG. 4A is a block diagram showing examples of CAN IDs allocated to the respective in-vehicle control apparatuses when an abnormality occurs, together with the vehicle network.
FIG. 4B is a block diagram showing an example of communication data transmission when an abnormality occurs, together with the vehicle network.

As shown in FIG. 3, when the CAN IDs are used appropriately, an ID "A" is allocated to an in-vehicle control apparatus 100A, an ID "B" is allocated to an in-vehicle control apparatus 100B, and an ID "C" and an ID "D" are allocated to an in-vehicle control apparatus 100C, for example. Further, an ID "E" is allocated to an in-vehicle control apparatus 100E, an ID "F" is allocated to an in-vehicle control apparatus 100F, and an ID "G" and an ID "H" are allocated to an in-vehicle control apparatus 100G. Note that in this example, the ID "A" has a highest priority level, whereupon the priority level decreases in alphabetical order.

When the in-vehicle control apparatus 100B, for example, transmits a data frame, the ID "B" of the in-vehicle control apparatus 100B is attached to the data frame. Similarly, when the in-vehicle control apparatus 100F, for example, transmits a data frame, the ID "F" of the in-vehicle control apparatus 100F is attached to the data frame.

Here, even when the in-vehicle control apparatus 100B and the in-vehicle control apparatus 100F, for example, transmit data frames simultaneously, the data frame having the ID "B" has a higher priority level than the ID "F", and is therefore transmitted preferentially. The data frame having the ID "F" is transmitted thereafter. Hence, even when a plurality of data frames are transmitted simultaneously, as long as different CAN IDs are attached to the data frames, the plurality of simultaneously transmitted data frames are transmitted appropriately.

Figure 5:
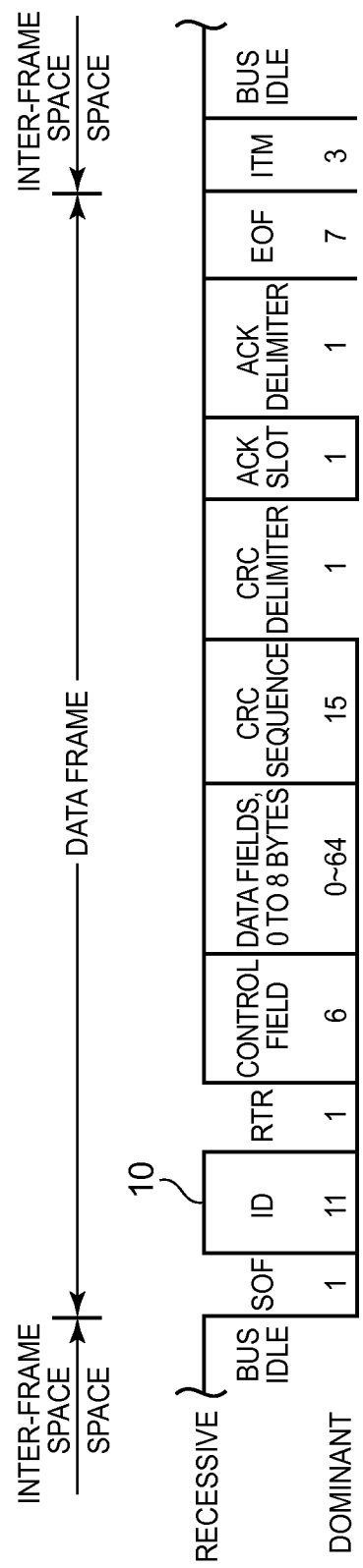
FIG. 5 is a view showing an example of a data frame transmitted to the vehicle network.
Figure 6:
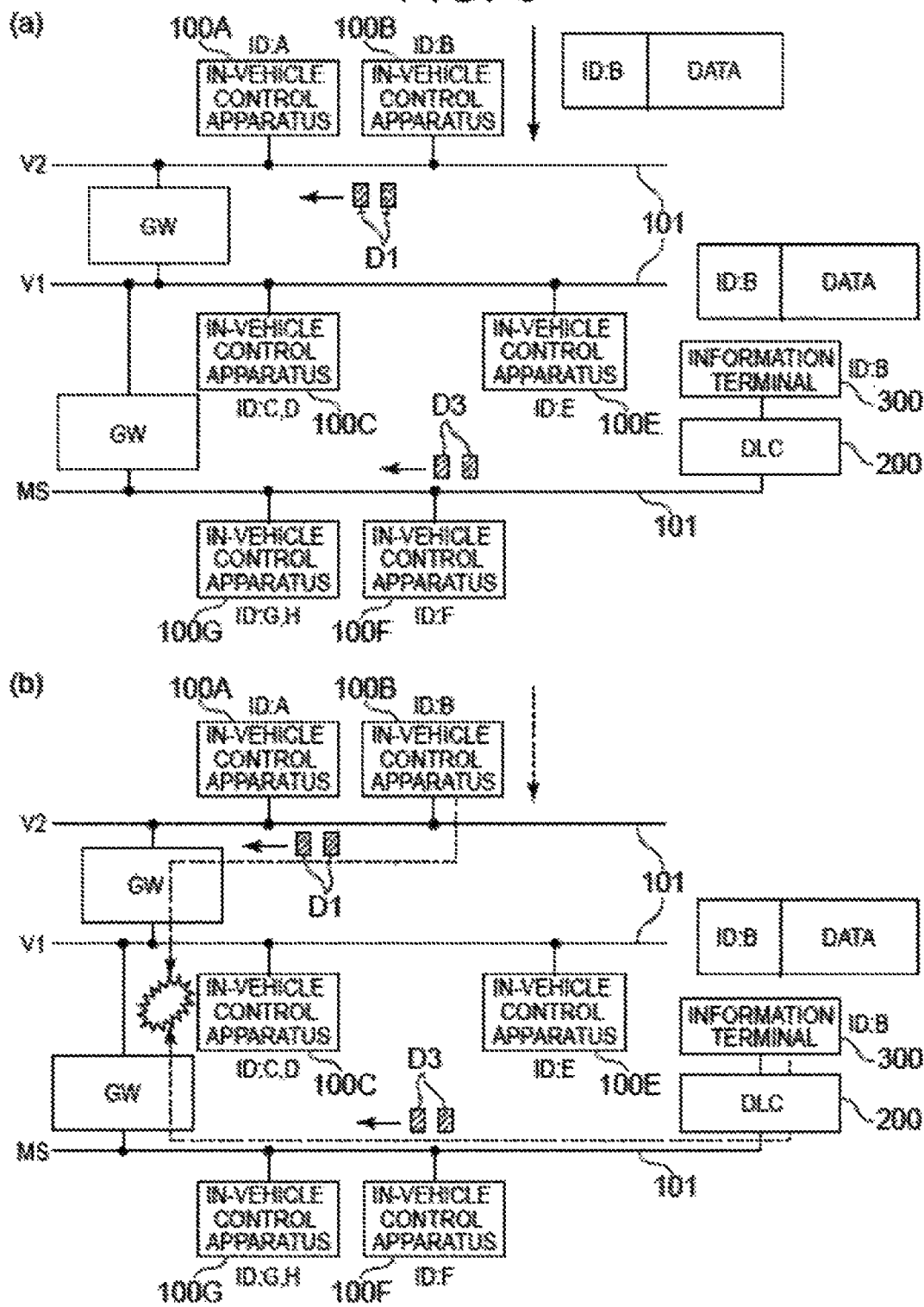
FIG. 6A is a block diagram showing an example of a vehicle network to which an information terminal misusing a duplicate CAN ID is connected.
FIG. 6B is a block diagram showing an example of communication data transmission by the information terminal and a legitimate in-vehicle control apparatus, together with the vehicle network.

On the other hand, as shown in FIG. 4A, for example, the ID "F" allocated to the in-vehicle control apparatus 100F may be illegally rewritten as the ID "B", for example, so as to duplicate the CAN ID of the in-vehicle control apparatus 100B. In other words, at this time, as shown in FIG. 5, an ID 10 in a data structure of the data frame may take an identical value.

When, as shown in FIG. 4A, data frames D1 and D2 having the shared ID "B" are transmitted at an identical timing from the in-vehicle control apparatuses 100B and 100F, for example, the plurality of data frames D1 and D2 having a shared CAN ID are transmitted to the vehicle network.

Further, as shown in FIG. 6A, an information terminal 300 such as a smartphone, for example, may be connected to the DLC 200 such that data communication is performed between the information terminal 300 and the in-vehicle control apparatuses 100A to 100G and so on. When an application program installed in the information terminal 300 is infected with a virus so that the information terminal 300 is operated illegally, the information terminal 300 illegally obtains the ID "B" used by the in-vehicle control apparatus 100B, for example. The information terminal 300 also analyzes the data frame transmission timing of the in-vehicle control apparatus 100B, for example. When the information terminal 300 transmits a data frame having the illegally obtained ID "B" at the analyzed transmission timing, a data frame D3 transmitted by the information terminal 300 and the data frame D1 transmitted by the in-vehicle control apparatus 100B are transmitted to the vehicle network simultaneously.

As shown in FIGS. 4B and 6B, when data frames having the shared ID "B" but different data content are transmitted simultaneously to the vehicle network in this manner, a bus level of the in-vehicle control apparatus 100B, shown in FIG. 7A, differs from a signal level of the data frame transmitted to the vehicle network from the in-vehicle control apparatus 100F, shown in FIG. 7B, for example. In other words, the data frame D1 transmitted by the in-vehicle control apparatus 100B shares a CAN ID with the data frame D2 transmitted by the in-vehicle control apparatus 100F and the data frame D3 transmitted by the information terminal 300, but differs therefrom partially in the data content.

Figure 7:
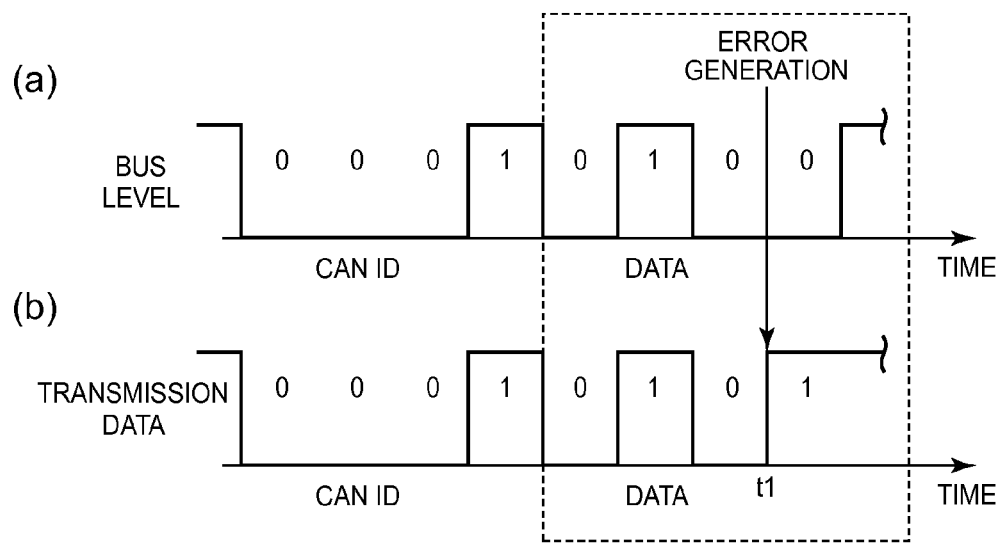
FIG. 7A is a time chart showing an example of a transition of a bus level of the legitimate in-vehicle control apparatus.
FIG. 7B is a time chart showing an example of a transition of a signal level of a data frame transmitted to the vehicle network.
Figure 8:
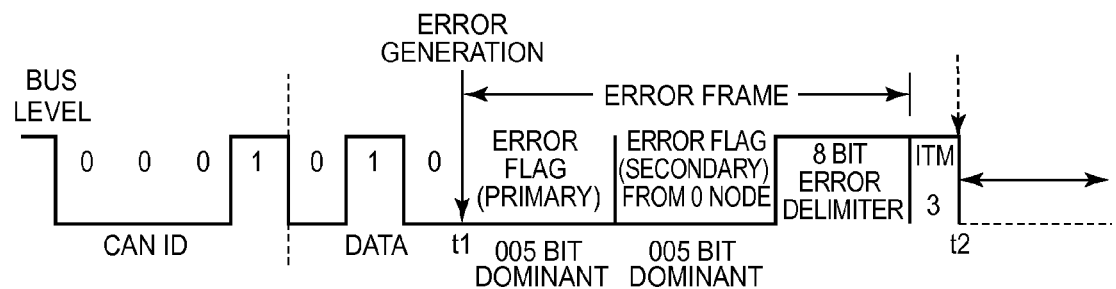
FIG. 8 is a time chart showing an example of a transition of an error frame transmitted when data frames having duplicate CAN IDs are transmitted simultaneously.
Figure 9:
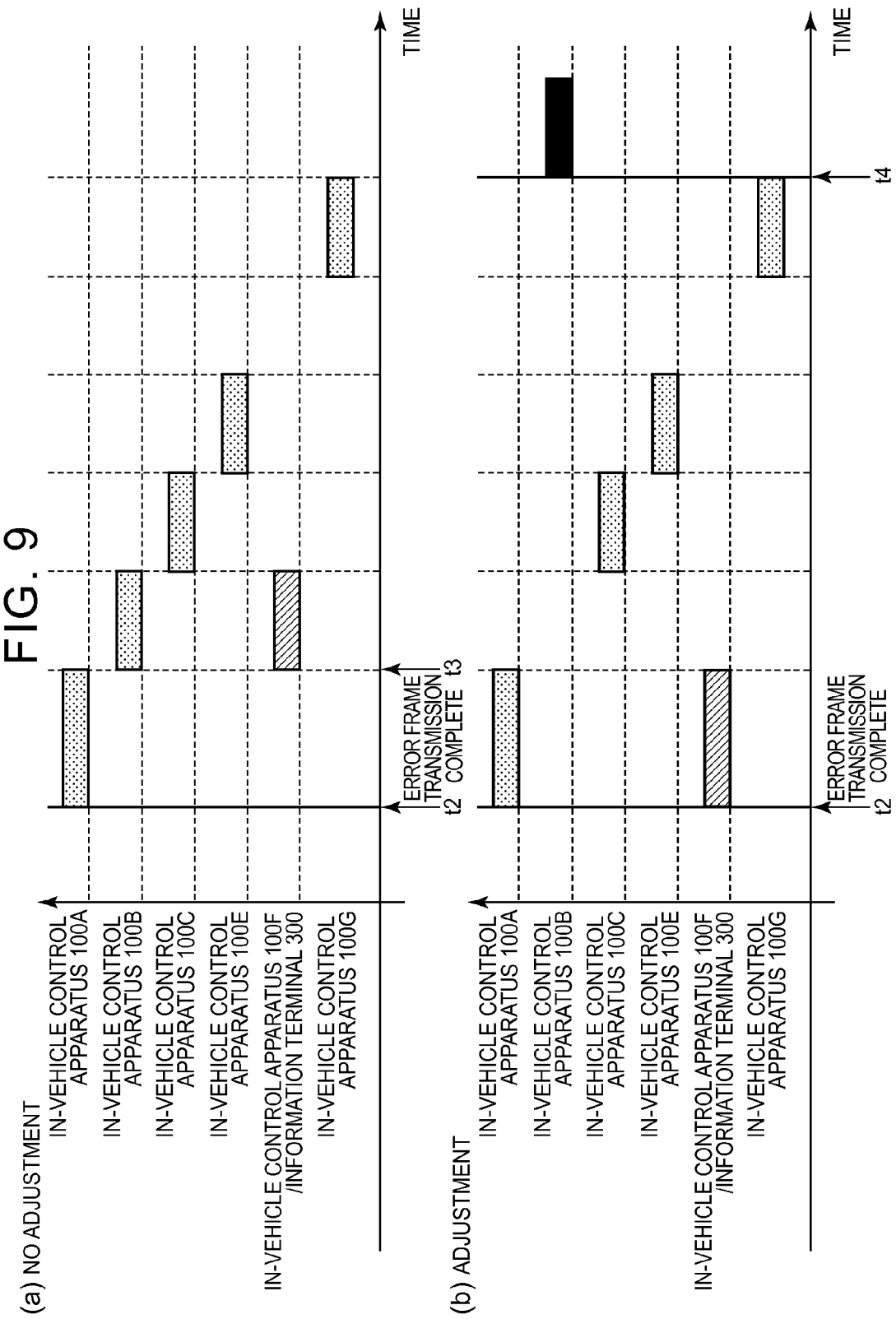
FIG. 9A is a time chart showing, as a comparative example, an example of data frame transmission by a plurality of in-vehicle control apparatuses when data frames are retransmitted without executing adjustment processing.
FIG. 9B is a time chart showing an example of data frame transmission by the plurality of in-vehicle control apparatuses when the data frames are retransmitted after executing the adjustment processing.

Accordingly, a network error occurs at a timing t1 in FIG. 7, and as shown in FIG. 8, for example, two six-bit error flags are transmitted to the vehicle network on the basis of the CAN communication regulations.

As shown in FIG. 9A, when transmission of the error frame is completed at a timing t2, the normally operating in-vehicle control apparatuses 100A, 100B, 100C, 100E, 100G retransmit the data frames interrupted by the error frame in order of the allocated IDs on the basis of the communication regulations of the vehicle network.

At this time, however, the in-vehicle control apparatus 100F or the information terminal 300 impersonating the in-vehicle control apparatus 100B illegally transmits a data frame simultaneously with the in-vehicle control apparatus 100B at a timing t3 estimated on the basis of the illegally obtained ID "B". As a result, the error frame is transmitted to the vehicle network again such that transmission and reception of the data frames intended to be passed through the vehicle network are obstructed. Note that here, since the in-vehicle control apparatus 100F and the information terminal 300 use the ID "B" used originally by the in-vehicle control apparatus 100B, the in-vehicle control apparatus 100F and the information terminal 300 are specified as illegal apparatuses.

Hence, in this embodiment, for example, the control determination unit 132 installed in the in-vehicle control apparatus 100B performs processing (adjustment processing) to modify the transmission timing of the data frame transmitted following transmission of the error frame in order to suppress simultaneous transmission of data frames by the in-vehicle control apparatuses 100B, 100F and the information terminal 300.

Accordingly, as shown in FIG. 9B, the timing at which the in-vehicle control apparatus 100B transmits the data frame is retarded from the predefined timing t2 to a timing t4 on the basis of the communication regulations of the vehicle network. As a result, the timing at which the in-vehicle control apparatus 100B transmits the data frame differs from the timing at which the in-vehicle control apparatus 100F and the information terminal 300 impersonating the in-vehicle control apparatus 100B transmit data frames. Error frame generation accompanying simultaneous transmission of data frames having duplicate CAN IDs is thus suppressed.

When the in-vehicle control apparatus 100B periodically transmits a data frame indicating a vehicle speed to be displayed on a speedometer, for example, from the timing t4 onward the data frame is transmitted periodically at period intervals based on the modified timing t4. Hence, from the timing t4 onward, simultaneous transmission to the vehicle network of the data frame transmitted by the in-vehicle control apparatus 100B and the data frames transmitted illegally by the in-vehicle control apparatus 100F and the information terminal 300 is suppressed, and therefore the error frame is not generated. Since error frame generation is suppressed, data frames are transmitted and received via the vehicle network smoothly.

Note that in the in-vehicle control apparatuses 100A to 100E and 100G, the control determination units 132 installed in the in-vehicle control apparatuses 100A to 100E and 100G, for example, recognize that the transmission timing of the data frame from the in-vehicle control apparatus 100B has been modified from the timing t2 to the timing t4. Accordingly, for example, a data frame transmitted at the timing t2 is determined by the in-vehicle control apparatuses 100A to 100E and 100G that receive the data frame to be a data frame transmitted illegally by the in-vehicle control apparatus 100F or the information terminal 300 impersonating the in-vehicle control apparatus 100B, and is therefore discarded. In other words, data frames transmitted illegally by the in-vehicle control apparatus 100F and the information terminal 300 are filtered by a gateway or the like, for example, so as to be removed from the vehicle network.

Further, for example, when data frames having duplicate CAN IDs are transmitted simultaneously by the in-vehicle control apparatus 100F and the information terminal 300, the control determination unit 132 installed in the DLC 200 to which the information terminal 300 is connected, for example, executes the adjustment processing on each data frame.

Next, referring to FIG. 10, actions of the communication management apparatus for a vehicle network and the communication management method for a vehicle network according to this embodiment will be described.

Figure 10:
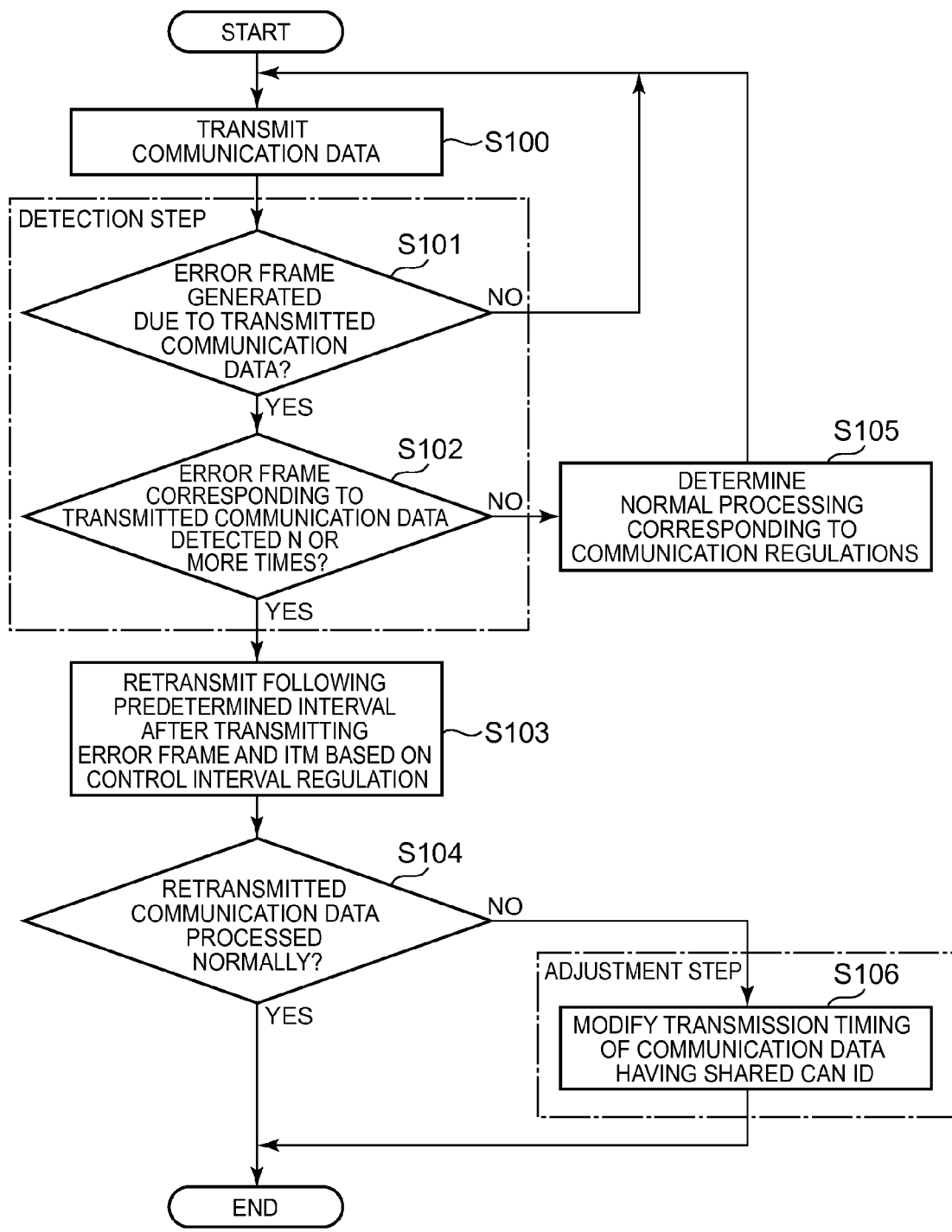
FIG. 10 is a flowchart showing an example of procedures executed during adjustment processing in the communication management apparatus for a vehicle network and the communication management method for a vehicle network according to this embodiment.

As shown in FIG. 10, for example, when a data frame is transmitted as communication data in step S100, the transmission period and so on of the data frame are calculated in relation to the CAN ID attached to the data frame.

Next, for example, when an error frame is generated upon transmission of a certain data frame to the vehicle network (step S101: YES), a determination is made as to whether or not a number of transmissions of the error frame equals or exceeds a prescribed number N prescribed in advance (step S102).

When the number of transmissions of the error frame is smaller than the prescribed number N (step S102: NO), it is determined that the error frame does not indicate an abnormality in the vehicle network, for example (step S105).

When the number of transmissions of the error frame equals or exceeds the prescribed number N (step S102: YES), on the other hand, it is determined that a plurality of data frames having duplicate CAN IDs have been transmitted to the vehicle network, and therefore the data frames transmitted during and before generation of the error frame are retransmitted (step S103). Note that retransmission timings of the data frames are determined on the basis of the control interval indicated by the prescription data stored in the storage area 134, for example. In this example, a time interval extending to the point at which transmission of the error frame and the ITM data transmitted after the error frame is complete is defined as the control interval. Further, when the data frames are retransmitted, the data frames are transmitted in order of the priority levels indicated by the CAN IDs attached to the respective data frames.

Next, following retransmission of the data frames, a determination is made as to whether or not the retransmitted data frames have been transmitted and received normally without regeneration of the error frame (step S104). When it is determined that the retransmitted data frames have been transmitted and received normally (step S104: YES), the processing is terminated.

When, on the other hand, the error frame is generated again following retransmission of the data frames, it is determined that a plurality of data frames having duplicate CAN IDs have been retransmitted simultaneously, and therefore the adjustment processing is executed to adjust the plurality of data frames having the duplicate CAN IDs (step S106). As the adjustment processing according to this embodiment, a transmission sequence of the retransmitted data frames having the duplicate CAN IDs, from among the data frames transmitted by the in-vehicle control apparatuses 100, is modified, for example (see FIG. 9B).

By modifying the transmission sequence of the retransmitted data frames having the duplicate CAN IDs in this manner, error frame generation is eliminated.

With the communication management apparatus for a vehicle network and the communication management method for a vehicle network according to this embodiment, as described above, following effects are obtained.

(1) The frame monitoring units 131 provided respectively in the in-vehicle control apparatuses 100 and the DLC 200 detect simultaneous transmission of communication data having a shared CAN ID. Further, when simultaneous communication data transmission is detected, the control determination units 132 provided respectively in the in-vehicle control apparatuses 100 and the DLC 200 execute adjustment processing to adjust the communication data having the shared CAN ID. Accordingly, a collision between a plurality of communication data having the shared CAN ID and network error generation accompanying simultaneous communication data transmission are suppressed. As a result, smooth communication can be maintained while performing communication in which CAN IDs are attached to the communication data.

(2) As the adjustment processing, the control determination unit 132 executes processing to modify the transmission timing of the simultaneously transmitted communication data from the timing allocated to the communication data. Accordingly, the transmission timing of at least one set of communication data from the plurality of communication data having duplicate identification information is modified, and as a result, simultaneous communication data transmission is eliminated.

(3) The control determination unit 132 also modifies the transmission timings of the transmission data that are retransmitted following transmission of the error frame transmitted when simultaneous communication data transmission is detected. Hence, when communication data are retransmitted after detecting simultaneous transmission of communication data having a shared CAN ID, simultaneous transmission of communication data having a shared CAN ID can be eliminated, and as a result, the retransmitted communication data can be transmitted and received appropriately.

(4) The control determination unit 132 executes the processing for modifying the transmission timing of the communication data when the error frame is detected at least the prescribed number of times N prescribed in advance. The adjustment processing for modifying the transmission timing is therefore executed only in a situation where communication data having a shared CAN ID are simultaneously transmitted continuously and repeatedly, and as a result, transmission timing modification can be limited to a minimum required range.

(5) The control determination unit 132 executes processing to adjust communication data transmitted by the in-vehicle control apparatuses 100 and communication data transmitted from the outside of the vehicle network via the DLC 200 as the communication data having a shared CAN ID. In so doing, the communication function of the vehicle network can be maintained appropriately through communication data adjustment while allowing externally transmitted communication data to be transmitted into the vehicle network.

(6) The control determination unit 132 executes processing to adjust communication data transmitted by the legitimate in-vehicle control apparatus 100B and communication data transmitted by the in-vehicle control apparatus 100F impersonating the in-vehicle control apparatus 100B as the communication data having a shared CAN ID. In so doing, the communication function of the vehicle network can be maintained appropriately through communication data adjustment even when a program of the in-vehicle control apparatus 100F connected to the vehicle network is illegally rewritten such that the in-vehicle control apparatus 100F operates illegally, or the unauthorized in-vehicle control apparatus 100F is attached to the vehicle network.

(7) The frame monitoring unit 131, which constitutes a detection unit, and the control determination unit 132 and transmission/reception control unit 133, which together constitute an adjustment unit, are provided in each of the plurality of in-vehicle control apparatuses 100 connected to the vehicle network. When the frame monitoring units 131 of the respective in-vehicle control apparatuses 100 detect communication data sharing a CAN ID with the CAN IDs allocated to the in-vehicle control apparatuses 100, the communication data transmitted by the in-vehicle control apparatuses 100 are adjusted through the adjustment processing performed by the control determination units 132. Hence, communication data adjustment is performed by the respective in-vehicle control apparatuses 100 serving as the transmission sources of the transmission data, and therefore communication data adjustment can be performed on the transmission sources of the communication data.

(8) A regulation according to which, when a communication data collision occurs due to simultaneous transmission of the communication data, an error frame indicating the communication data collision is transmitted to the vehicle network for a predetermined period is defined as a communication regulation of the vehicle network. Further, a regulation according to which, when transmission of the error frame is complete, the communication data are retransmitted in order of the priority level of the communication data, which is indicated by the identification information, is defined as a communication regulation of the vehicle network. When the simultaneously transmitted communication data are retransmitted, the control determination unit 132 executes the adjustment processing on the retransmitted communication data. Hence, when communication data having a shared CAN ID are retransmitted after being transmitted simultaneously, simultaneous transmission to the vehicle network of communication data having duplicate CAN IDs is suppressed. As a result, simultaneous transmission to the vehicle network of communication data having duplicate CAN IDs during communication data retransmission is suppressed while applying communication data retransmission regulations based on the CAN ID.

Second Embodiment

Next, a second embodiment of the communication management apparatus for a vehicle network and the communication management method for a vehicle network according to the invention will be described with reference to FIGS. 11 and 12, focusing on differences with the first embodiment. Note that basic configurations of the communication management apparatus for a vehicle network and the communication management method for a vehicle network according to this embodiment are identical to the first embodiment. Therefore, elements of this embodiment that are substantially identical to the first embodiment have been allocated identical reference numerals, and duplicate description thereof has been omitted.

Figure 11:
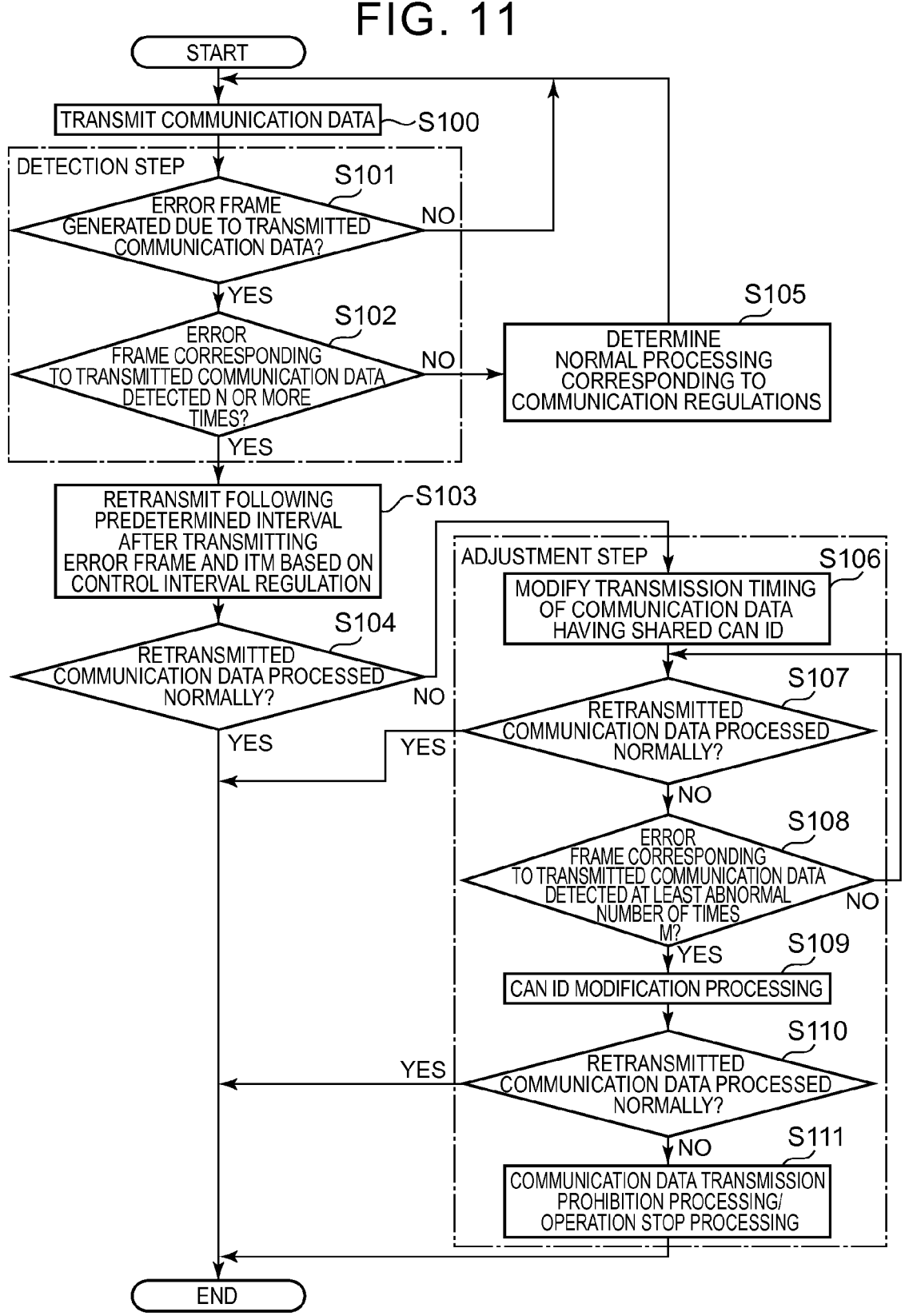
FIG. 11 is a flowchart showing an example of procedures executed during adjustment processing in a communication management apparatus for a vehicle network and a communication management method for a vehicle network according to a second embodiment of the invention.

As shown in FIG. 11, in this embodiment, after executing the processing of step S100 to step S106 shown in FIG. 10, a further determination is made as to whether or not the data frame having the modified transmission timing has been transmitted normally (step S107).

When a data frame having a CAN ID that is shared with the data frame having the modified transmission timing is transmitted at the modified timing, the error frame is generated again. A number of detections of the regenerated error frame eventually equals or exceeds an abnormality detection number M (M>N) prescribed in advance (step S107: YES, S108).

According to this embodiment, in such a case processing is executed to modify the ID "B" allocated to the impersonated in-vehicle control apparatus 100B, for example, as the adjustment processing (step S109).

Figures 12, 13:
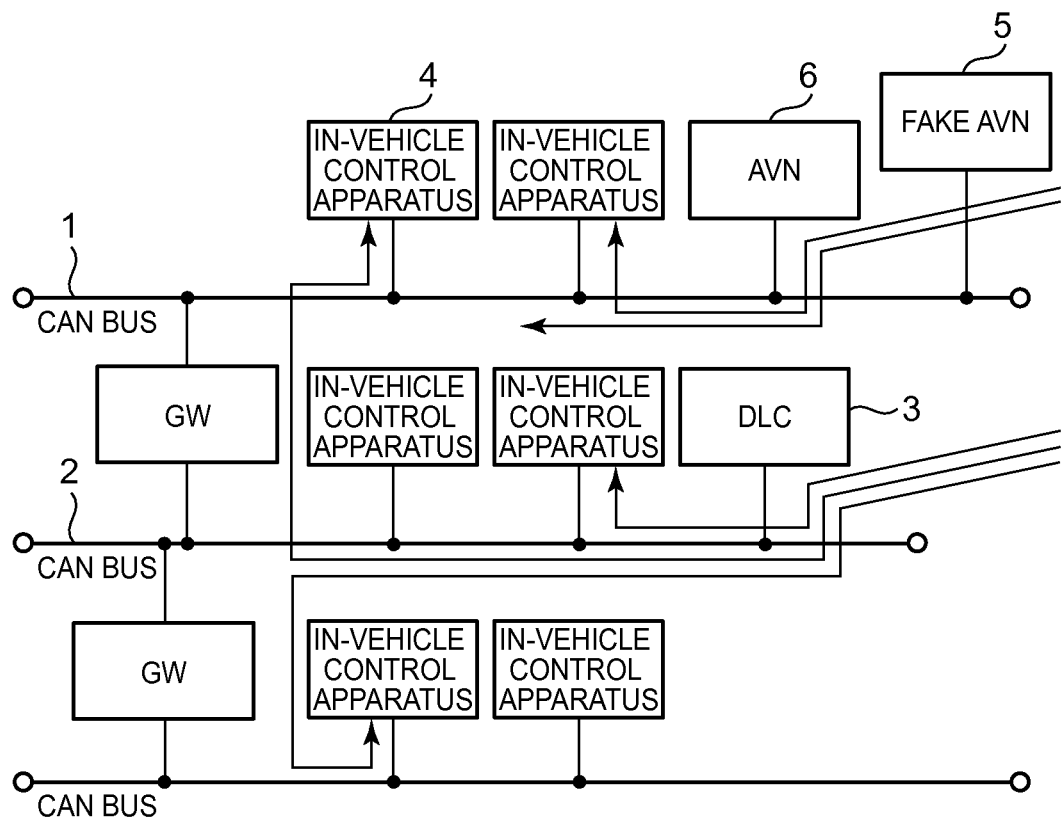
FIG. 12 is a view showing examples of CAN IDs modified during the adjustment processing according to this embodiment.
FIG. 13 is a view showing an example of a vehicle network in which an illegally attached apparatus or the like is connected to the vehicle network.

Hence, as shown in FIG. 12, the CAN ID allocated to the in-vehicle control apparatus 100B is modified from the ID "B" to an ID "X", for example. As a result, the CAN ID of the in-vehicle control apparatus 100B differs from the CAN ID misused by the in-vehicle control apparatus 100F or the information terminal 300 impersonating the in-vehicle control apparatus 100B. Note that replacement CAN IDs such as the ID "X" are registered in advance in the respective storage areas 134 of the legitimate in-vehicle control apparatuses 100 and the DLC 200, for example. Therefore, even when the CAN ID used by the in-vehicle control apparatus 100B is modified to the ID "X", the legitimate in-vehicle control apparatuses 100 and the DLC 200 can recognize that the ID "X" is the ID of a data frame transmitted by the legitimate in-vehicle control apparatus 100B.

Furthermore, as shown in step S110 of FIG. 11, a determination is made as to whether or not a data frame having the modified CAN ID has been transmitted normally. When it is determined as a result that the data frame having the modified CAN ID has been transmitted normally (step S110: YES), this means that the cause of error frame generation has been eliminated, and therefore the processing is terminated.

Here, the in-vehicle control apparatus 100F and the information terminal 300 impersonating the in-vehicle control apparatus 100B may, for example, obtain the modified ID "X" used by the in-vehicle control apparatus 100B illegally and transmit data frames having the illegally obtained ID "X" to the vehicle network at an identical timing to the in-vehicle control apparatus 100B (step S110: NO). In this case, when the in-vehicle control apparatus 100B transmits a data frame having the ID "X", the in-vehicle control apparatus 100F and the information terminal 300 transmit unauthorized data frames to the vehicle network. As a result, the error frame is transmitted to the vehicle network again.

Hence, in this embodiment, further processing to prohibit the in-vehicle control apparatus 100B from transmitting data frames or to halt the operation of the in-vehicle control apparatus 100B, for example, is executed as the adjustment processing in step S111. Alternatively, for example, processing to prohibit the DLC 200 to which the information terminal 300 is connected and the in-vehicle control apparatus 100F from transmitting data frames or processing to halt the operations thereof is executed as the adjustment processing. In so doing, the data frame serving as the generation source of the error frame is prevented from being transmitted to the vehicle network, and as a result, generation of the error frame is suppressed.

With the communication management app for a vehicle network and the communication management method for a vehicle network according to this embodiment, as described above, following effects are obtained in addition to the above effects (1) to (8).

(9) The control determination unit 132 further executes processing to modify the CAN ID of simultaneously transmitted communication data as the adjustment processing. In so doing, duplication of the CAN IDs used as the identification information is eliminated, whereby transmission to the vehicle network of communication data having a shared CAN ID is suppressed. As a result, the communication function of the vehicle network can be maintained appropriately by modifying the CAN ID.

(10) The control determination unit 132 executes the processing to modify the CAN ID when communication data having a shared CAN ID are transmitted simultaneously again following modification of the transmission timing. Hence, the transmission timing is modified before modifying the CAN ID, and therefore the CAN ID is modified only when simultaneous communication data transmission is not eliminated by modifying the transmission timing. As a result, CAN ID modification can be limited to a minimum required range so that the CAN IDs can be managed with stability.

(11) The control determination unit 132 executes the processing to modify the CAN ID when simultaneous communication data transmission is detected at least a prescribed number of times prescribed in advance. Hence, the CAN ID is modified only in a situation where communication data having a shared CAN ID are simultaneously transmitted continuously and repeatedly, and as a result, the allocated CAN IDs can be managed with stability.

(12) As the adjustment processing, the control determination unit 132 executes processing to prohibit transmission of communication data having a shared CAN ID when simultaneous communication data transmission is detected at least the abnormal number of times (M) indicating an abnormality in the vehicle network. By executing this adjustment processing, the legitimate in-vehicle control apparatus 100B, for example, is prohibited from transmitting the data frame that serves as one of the transmission sources of the error frame. In so doing, the data frame that serves as the transmission source of the error frame is prevented from being transmitted to the vehicle network, and therefore generation of the error frame is suppressed. Further, by executing this adjustment processing, data frame transmission by the in-vehicle control apparatus 100F and the information terminal 300 impersonating the legitimate in-vehicle control apparatus 100B, for example, is likewise prohibited. In so doing, the in-vehicle control apparatus 100F and the information terminal 300 are prevented from transmitting data frames illegally to the vehicle network, and as a result, security can be maintained on the vehicle network.

(13) As the adjustment processing, the control determination unit 132 executes processing to halt the operations of the transmission sources of the communication data having the shared CAN ID when the error frame that accompanies simultaneous communication data transmission is detected at least the abnormal number of times (M) indicating an abnormality in the vehicle network. By executing this adjustment processing, the operation of the impersonated in-vehicle control apparatus 100B, for example, is stopped. Accordingly, the data frame that serves as the transmission source of the error frame is prevented from being transmitted to the vehicle network, and therefore generation of the error frame is suppressed. Further, by executing this adjustment processing, the operations of the devices impersonating the legitimate in-vehicle control apparatus 100B, i.e. DLC 200 to which the information terminal 300 is connected and the in-vehicle control apparatus 100F, for example, are stopped. Accordingly, the operations of the information terminal 300 and the in-vehicle control apparatus 100F that induce the error frame by transmitting data frames illegally are stopped. In so doing, the in-vehicle control apparatus 100F and the information terminal 300 are prevented from transmitting data frames illegally to the vehicle network, and as a result, security can be maintained on the vehicle network.

(14) The control determination unit 132 executes the processing to prohibit transmission of the communication data having the shared CAN ID or the processing to stop the operations of the transmission sources of the communication data having the shared CAN ID after modifying the transmission timing and the CAN ID of the simultaneously transmitted communication data. When communication data having a shared CAN ID are still transmitted simultaneously even after modifying the transmission timing and the CAN ID, there is a high probability that the device or the like impersonating the legitimate in-vehicle control apparatus 100B is transmitting communication data to the vehicle network illegally. Hence, when generation of the error frame is not eliminated even after performing the adjustment processing in steps so as to modify the transmission timing and then modify the CAN ID, the illegal communication data are prevented from infiltrating the vehicle network by restricting transmission of the illegal communication data or stopping the transmission source thereof. In so doing, a high level of security can be maintained on the vehicle network while performing the adjustment processing in steps.

OTHER EMBODIMENTS

Note that the embodiments described may be implemented as follows.

In the above embodiments, as the adjustment processing, the control determination unit 132 executes processing to retard the transmission timing of the simultaneously transmitted communication data from the timing allocated to the communication data. The invention is not limited thereto, however, and instead, the control determination unit 132 may execute processing to advance the transmission timing of the simultaneously transmitted communication data from the timing allocated to the communication data as the adjustment processing.

In the above embodiments, the control determination unit 132 provided in one of the in-vehicle control apparatuses 100 executes the processing to modify the transmission timing of the simultaneously transmitted communication data from the timing allocated to the communication data as the adjustment processing. Instead, the control determination units 132 installed in the plurality of in-vehicle control apparatuses 100 and the DLC 200 may execute processing to modify the transmission timings of all of the communication data transmitted to the vehicle network as the adjustment processing. In so doing, the transmission timings of the communication data are more difficult to determine likewise with regard to the in-vehicle control apparatuses other than the in-vehicle control apparatus 100B whose CAN ID has already been obtained illegally or the like, and as a result, error frame generation can be forestalled.

In the second embodiment, the control determination unit 132 executes (C) the processing to prohibit transmission of the communication data having the shared CAN ID or (D) the processing to stop the operations of the transmission sources of the communication data having the shared CAN ID when the error frame is detected at least the abnormal number of times indicating an abnormality in the vehicle network. The invention is not limited thereto, however, and the control determination unit 132 may execute the processing of (C) or (D) when the error frame is detected at least once.

In the second embodiment, the control determination unit 132 executes (C) the processing to prohibit transmission of the communication data having the shared CAN ID when simultaneous transmission of the communication data is detected at least the abnormal number of times indicating an abnormality in the vehicle network. The invention is not limited thereto, however, and the control determination unit 132 may execute the processing of (C) when the error frame is detected at least once.

In the second embodiment, the control determination unit 132 executes (A) the processing to modify the transmission timing of the simultaneously transmitted communication data and (B) the processing to modify the CAN ID. Next, the control determination unit 132 executes (C) the processing to prohibit transmission of the communication data having the shared CAN ID or (D) the processing to stop the operations of the transmission sources of the communication data having the shared CAN ID. The invention is not limited thereto, however, and the control determination unit 132 may execute the processing of (C) or (D) before the processing of (A) or (B). Further, the control determination unit 132 may execute the processing of (B) before the processing of (A).

In the second embodiment, the control determination unit 132 executes (A) the processing to modify the transmission timing of the simultaneously transmitted communication data and (B) the processing to modify the CAN ID as the adjustment processing. Moreover, in the second embodiment, the control determination unit 132 executes (C) the processing to prohibit transmission of the communication data having the shared CAN ID or (D) the processing to stop the operations of the transmission sources of the communication data having the shared CAN ID as further adjustment processing. The invention is not limited thereto, however, and the control determination unit 132 may execute at least one of (A) to (D) as the adjustment processing.

In the above embodiments, the control determination unit 132 executes processing to adjust communication data transmitted by the in-vehicle control apparatuses 100 and communication data transmitted from the outside of the vehicle network via the DLC 200 as the communication data having a shared CAN ID. Further, the control determination unit 132 executes processing to adjust communication data transmitted by the legitimate in-vehicle control apparatus 100B and communication data transmitted by the in-vehicle control apparatus 100F impersonating the in-vehicle control apparatus 100B as the communication data having a shared CAN ID. The invention is not limited thereto, however, and the control determination unit 132 may adjust communication data having a shared CAN ID when a shared CAN ID is allocated accidentally to a plurality of the in-vehicle control apparatuses 100A to 100G and so on, for example.

In the above embodiments, the control determination unit 132 executes the processing to modify the transmission timing of the communication data when the error frame is detected at least the prescribed number of times N prescribed in advance. The invention is not limited thereto, however, and the control determination unit 132 may perform the processing to modify the transmission timing of the communication data when at least one error frame is detected.

In the above embodiments, the frame monitoring unit 131 detects simultaneous transmission of communication data having a shared CAN ID by monitoring the error frame. The invention is not limited thereto, however, and the frame monitoring unit 131 may detect simultaneous transmission of communication data having a shared CAN ID on the basis of the transmission timings of the communication data transmitted to the vehicle network and the CAN IDs allocated to the communication data.

In the above embodiments, the control determination unit 132 modifies the transmission timing of the communication data that are retransmitted following transmission of the error frame transmitted when simultaneous communication data transmission is detected. The invention is not limited thereto, however, and the control determination unit 132 may modify the transmission timings of communication data transmitted before and after transmission of the error frame.

In the above embodiments, a data frame based on CAN communication regulations serves as the communication data. The invention is not limited thereto, however, and any data that are transmitted in accordance with specifications of the vehicle network may be used as the communication data. Further, the specifications of the vehicle network are not limited to a CAN, and any network enabling transmission of communication data by in-vehicle control apparatuses and so on, such as a FlexRay, an IDB-1394, a BEAN, a LIN, an AVC-LAN, or a MOST may be used instead.

In the above embodiments, a CAN ID is used as the identification information. However, any information that is attached to identify the transmission source of the communication data, the communication classification, and so on may be used as the identification information.

In the above embodiments, the detection unit and the adjustment unit are provided in the plurality of in-vehicle control apparatuses 100 and the DLC 200. The invention is not limited thereto, however, and the detection unit and adjustment unit may be provided in a specific in-vehicle control apparatus 100 alone or the DLC 200 alone. Moreover, the detection unit and the adjustment unit may be provided in a gateway that is connected to the vehicle network in order to relay a CAN bus.

1, 2 communication line
3 DLC
4 in-vehicle control apparatus
5 illegal apparatus
100A to 100G in-vehicle control apparatus
101 communication line
110 central processing apparatus
120 CAN controller
130 transmission/reception function unit
131 frame monitoring unit
132 control determination unit
133 transmission/reception control unit
134 storage area
200 DLC
230 transmission/reception function unit
300 information terminal

The invention claimed is:

1. A communication management apparatus for a vehicle network, which manages data communication in the vehicle network on which communication data are exchanged among a plurality of in-vehicle control apparatuses, wherein legitimate in-vehicle control apparatuses are connected to the vehicle network and transmit the communication data after attaching identification information that differs for each of the legitimate in-vehicle control apparatuses thereto, the apparatus comprising:
a controller configured to detect simultaneous transmission of communication data having the identification information that is allocated to one of the legitimate in-vehicle control apparatuses; and
wherein the controller is further configured to execute adjustment processing to adjust the communication data having the shared identification information when the controller detects simultaneous transmission of the communication data,
wherein the controller executes, as the adjustment processing, processing to modify a transmission timing of the communication data transmitted by the legitimate in-vehicle control apparatus allocated the identification information that is attached to the simultaneously transmitted communication data from a timing allocated to the communication data.

2. The communication management apparatus for a vehicle network according to claim 1, wherein the controller performs transmission timing modification on a transmission timing of communication data that are retransmitted following transmission of an error frame transmitted when simultaneous transmission of the communication data is detected.

3. The communication management apparatus for a vehicle network according to claim 1, wherein the controller executes, as the adjustment processing, processing to modify the identification information attached to the simultaneously transmitted communication data.

4. The communication management apparatus for a vehicle network according to claim 3, wherein the controller executes the processing to modify the identification information when simultaneous transmission of the communication data is detected at least a prescribed number of times as prescribed in advance.

5. The communication management apparatus for a vehicle network according to claim 1, wherein the controller executes, as the adjustment processing, at least one of:
  a. processing to prohibit transmission of the communication data having the shared identification information; or
  b. processing to stop an operation of a transmission source of the communication data having the shared identification information,
  when simultaneous transmission of the communication data is detected at least an abnormal number of times indicating an abnormality in the vehicle network.

6. The communication management apparatus for a vehicle network according to claim 1, wherein the controller executes processing to adjust communication data transmitted by the in-vehicle control apparatuses and communication data transmitted from outside the vehicle network as the communication data having the shared identification information.

7. The communication management apparatus for a vehicle network according to claim 1, wherein a controller is provided in each of the plurality of in-vehicle control apparatuses, and
when each controller detects communication data sharing identification information with the identification information allocated to the in-vehicle control apparatuses, the in-vehicle control apparatuses adjust the communication data transmitted thereby via the adjustment processing executed by each controller.

8. The communication management apparatus for a vehicle network according to claim 1, wherein
a regulation according to which, when a communication data collision occurs due to simultaneous transmission of the communication data, an error frame indicating the communication data collision is transmitted to the vehicle network for a predetermined period, and a regulation according to which, following transmission of the error frame, the communication data are retransmitted in order of a priority level of the communication data, which is indicated by the identification information, are defined as communication regulations of the vehicle network, and when the simultaneously transmitted communication data are retransmitted, the controller executes the adjustment processing on the retransmitted communication data.

9. The communication management apparatus for a vehicle network according to claim 1, wherein the controller, upon detected simultaneous transmission of the communication data, specifies transmission sources of the simultaneously transmitted communication data, and of the specified transmission sources, specifies a transmission source different from the legitimate in-vehicle control apparatus allocated the identification information that is attached to the simultaneously transmitted communication data as an illegal apparatus that transmits communication data to the vehicle network illegally.

10. A communication management method for a vehicle network, which is used to manage data communication in the vehicle network on which communication data are exchanged among a plurality of in-vehicle control apparatuses, wherein legitimate in-vehicle control apparatuses are connected to the vehicle network transmit the communication data after attaching identification information that differs for each of the legitimate in-vehicle control apparatuses thereto, the method comprising:

detecting simultaneous transmission of communication data having the identification information that is allocated to one of the legitimate in-vehicle control apparatuses; and adjusting the communication data having the shared identification information when simultaneous transmission of the communication data is detected, wherein, the communication data are adjusted by modifying a transmission timing of the communication data transmitted by the legitimate in-vehicle control apparatus allocated the identification information that is attached to the simultaneously transmitted communication data from a timing allocated to the communication data.

11. The communication management method for a vehicle network according to claim 10, wherein transmission timing modification is performed on a transmission timing of communication data that are retransmitted following transmission of an error frame transmitted when simultaneous transmission of the communication data is detected.

12. The communication management method for a vehicle network according to claim 10, wherein the communication data are adjusted by modifying the identification information attached to the simultaneously transmitted communication data.

13. The communication management method for a vehicle network according to claim 10, wherein adjusting the communication having the shared identification information includes:
a. prohibiting transmission of the communication data having the shared identification information; and
b. stopping an operation of the in-vehicle control apparatus that transmits the communication data having the shared identification information, and when simultaneous transmission of the communication data is detected at least an abnormal number of times indicating an abnormality in the vehicle network, the communication data are adjusted by performing at least one of prohibiting the transmission of the communication data having the shared identification information and stopping the operation of the in-vehicle control apparatus that transmits the communication data having the shared identification information.

14. The communication management method for a vehicle network according to claim 10, wherein communication data transmitted by the in-vehicle control apparatuses and communication data transmitted from outside the vehicle network are adjusted as the communication data having the shared identification information.

15. The communication management method for a vehicle network according to claim 10, wherein when simultaneous transmission of the communication data is detected, transmission sources of the simultaneously transmitted communication data are specified, and of the specified transmission sources, a transmission source different from the legitimate in-vehicle control apparatus allocated the identification information that is attached to the simultaneously transmitted communication data is specified as an illegal apparatus that transmits communication data to the vehicle network illegally.

* * * * *